United States Patent
Claridge et al.

(10) Patent No.: US 12,410,328 B2
(45) Date of Patent: Sep. 9, 2025

(54) CARBON SUPPORTED SURFACE FUNCTIONALIZED SILVER NANOPARTICLES

(71) Applicant: Xerox Corporation, Norwalk, CT (US)

(72) Inventors: Robert Claridge, Cambridge (CA); Yujie Zhu, Mississauga (CA); Yulin Wang, Oakville (CA); David Lawton, Burlington (CA)

(73) Assignee: Xerox Corporation, Norwalk, CT (US)

( * ) Notice: Subject to any disclaimer, the term of this patent is extended or adjusted under 35 U.S.C. 154(b) by 141 days.

(21) Appl. No.: 17/810,979

(22) Filed: Jul. 6, 2022

(65) Prior Publication Data
US 2024/0010855 A1    Jan. 11, 2024

(51) Int. Cl.
| | |
|---|---|
| C09D 11/037 | (2014.01) |
| C09C 3/08 | (2006.01) |
| B22F 1/054 | (2022.01) |
| B22F 1/102 | (2022.01) |
| B22F 1/14 | (2022.01) |
| B22F 9/24 | (2006.01) |
| B82Y 30/00 | (2011.01) |
| B82Y 40/00 | (2011.01) |

(52) U.S. Cl.
CPC ............ *C09D 11/037* (2013.01); *C09C 3/08* (2013.01); *B22F 1/054* (2022.01); *B22F 1/102* (2022.01); *B22F 1/14* (2022.01); *B22F 9/24* (2013.01); *B82Y 30/00* (2013.01); *B82Y 40/00* (2013.01)

(58) Field of Classification Search
CPC ......... C09D 11/037; C09C 3/08; B82Y 30/00; B82Y 40/00; B22F 1/054; B22F 1/102; B22F 1/14; B22F 9/24

USPC .................................................. 427/125, 212
See application file for complete search history.

(56) References Cited

U.S. PATENT DOCUMENTS

| | | | | |
|---|---|---|---|---|
| 7,538,062 B1* | 5/2009 | Dai | ............ | B01J 23/38 |
| | | | | 977/890 |
| 8,900,704 B1* | 12/2014 | Zinn | ............ | H01L 23/373 |
| | | | | 361/708 |
| 9,860,983 B2* | 1/2018 | Kurihara | ............ | B22F 1/142 |
| 10,818,405 B2 | 10/2020 | Ishii et al. | | |

(Continued)

FOREIGN PATENT DOCUMENTS

KR    20120047455 A    5/2012

OTHER PUBLICATIONS

Wang et al.—"Carbon supported Ag nanoparticles with different particle size as cathode catalyst for anion exchange membrane direct glycerol fuel cells"—Renewable Energy, pp. 556-562 (Year: 2014).*

(Continued)

*Primary Examiner* — Brian K Talbot (57) ABSTRACT

Carbon supported surface functionalized silver nanoparticles and a method for preparing the same are disclosed. For example, a composition includes carbon supported surface functionalized silver nanoparticles, The methods include preparing a liquid-containing composition comprising a plurality of silver nanoparticles and adding a carbon structure with the liquid-containing composition to form the carbon supported silver nanoparticles in-situ or mixing a composition comprising a carbon structure, a plurality of silver nanoparticles, and a liquid to grow silver nanoparticles on the carbon structure in-situ.

13 Claims, 5 Drawing Sheets

(56) References Cited

U.S. PATENT DOCUMENTS

| | | | | |
|---|---|---|---|---|
| 2011/0203414 | A1* | 8/2011 | Tan | B22F 9/24 |
| | | | | 554/71 |
| 2011/0305821 | A1* | 12/2011 | Wu | C09D 11/322 |
| | | | | 252/519.2 |
| 2013/0202909 | A1* | 8/2013 | Byun | B22F 1/054 |
| | | | | 75/370 |
| 2015/0231698 | A1 | 8/2015 | Kurihara | |
| 2016/0222502 | A1* | 8/2016 | Gondal | B01J 35/45 |
| 2016/0264810 | A1* | 9/2016 | Okamoto | C09D 11/36 |
| 2016/0297982 | A1* | 10/2016 | Hinotsu | C09D 11/36 |
| 2017/0120394 | A1* | 5/2017 | Shingai | H01B 1/22 |
| 2017/0306172 | A1* | 10/2017 | Koduma | C09D 1/00 |
| 2018/0066148 | A1* | 3/2018 | Koduma | C09D 5/24 |
| 2018/0207590 | A1* | 7/2018 | Khashab | B01D 71/02232 |
| 2018/0221843 | A1* | 8/2018 | Wakisaka | C08G 71/02 |
| 2019/0126247 | A1* | 5/2019 | Deeba | B01D 53/945 |
| 2020/0321139 | A1* | 10/2020 | Teragawa | H01B 1/22 |
| 2021/0269311 | A1* | 9/2021 | Chiu | A61B 6/583 |
| 2022/0258231 | A1* | 8/2022 | Kitagawa | B22F 9/24 |
| 2023/0183512 | A1* | 6/2023 | Lysien | C09D 11/36 |
| | | | | 347/110 |
| 2023/0304175 | A1* | 9/2023 | Zhong | C25B 11/065 |

OTHER PUBLICATIONS

Tinker Henry R et al: "Synthetic tethered silver nanoparticles on reduced graphene oxide for alkaline oxygen reduction catalysis", Journal of Material Science, vol. 56, No. 11, Jan. 18, 2021 (Jan. 18, 2021), pp. 6966-6976.

Liu Anmin et al: "A facile approach for the fabrication of loading-controlled Ag/C foam catalyst", Ionics, Kiel, De, vol. 25, No. 1, Oct. 18, 2018 (Oct. 18, 2018), pp. 361-365.

Stosevski Ivan et al: "Radiolitically synthesized nano Ag/C catalysts for oxygen reduction and borohydride oxidation reactions in alkaline media, for potential applications in fuel cells", Energy, Elsevier, Amsterdam, NL, vol. 101, Feb. 27, 2016 (Feb. 27, 2016), pp. 79-90.

Anil K Karumuri et al: "Silver nanoparticles supported on carbon nanotube carpets: influence of surface functionalization", Nanotechnology, Institute of Physics Publishing, Bristol, GB, vol. 27, No. 14, Feb. 26, 2016 (Feb. 26, 2016), p. 145603.

Truong Van Men et al: "Comparison of Carbon Supports in Anion Exchange Membrane Fuel Cells", Materials, vol. 13, No. 23, Nov. 26, 2020 (Nov. 26, 2020), p. 5370.

Extended European Search Report, Application No. 23179708.5, Nov. 15, 2023 (Nov. 15, 2023).

* cited by examiner

CARBON SUPPORTED SURFACE FUNCTIONALIZED SILVER NANOPARTICLES

The present disclosure relates generally to carbon supported surface functionalized silver nanoparticles and methods for preparing the same.

BACKGROUND

Silver nanoparticles have interesting physiochemical and antimicrobial properties that make them suitable for a wide variety of applications. The applications include, but are not limited to: catalysts, chemical sensors, biomedicines, medical devices, functional textiles, cosmetics, food packaging, food supplements, odor-resistant items, electronics, household appliances, dental amalgam, water disinfectants, paints/inks, and the like.

SUMMARY

According to aspects illustrated herein, there is provided a composition and a method for preparing the composition. One disclosed feature of the embodiments is a composition comprising carbon supported surface functionalized silver nanoparticles.

Another disclosed feature of the embodiments is an in-situ method to prepare carbon supported silver nanoparticles. The method comprises preparing a liquid-containing composition comprising a plurality of silver nanoparticles and adding a carbon structure with the liquid-containing composition to form the carbon supported silver nanoparticles in-situ.

Another disclosure feature of the embodiments is an in-situ method to prepare carbon supported silver nanoparticles. The method comprises mixing a composition comprising a carbon structure, a plurality of silver nanoparticles, and a liquid to grow silver nanoparticles on the carbon structure in-situ.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses example carbon supported surface functionalized silver nanoparticles and a method for fabricating the same via in-situ methods. As discussed above, silver nanoparticles have interesting physiochemical and antimicrobial properties that make them suitable for a wide variety of applications. One example is for the field of $CO_2$ capture and utilization (CCU) using electro-catalytic conversion of $CO_2$ into value-added chemicals and synthetic fuels.

At the current stage, electrochemical conversion of $CO_2$ into CO is one of the most promising reactions, due to its high technological and economic feasibility. In this reaction, syngas (CO and $H_2$) can be generated in an energy-efficient way and then used as feedstocks to produce synthetic hydrocarbons via a Fischer-Tropsch synthesis process.

The key to the electrochemical conversion process is the electro-catalysts with high efficiency and selectivity, as well as long-term stability. Recent years have witnessed significant advances in the development of electro-catalysts that can selectively reduce $CO_2$ to CO, including Au, Ag, Zn, Pd, and Ga, etc. Among all the candidates, silver shows the highest potential for large-scale applications, owning to its moderate cost and high catalytic selectivity for CO production. Despite the extensive study on Ag-based electro-catalysts, challenges remain in developing materials with enhanced catalytic selectivity at reduced overpotentials, in a simple, scalable, and cost-efficient way.

The present disclosure uses carbon supported surface functionalized silver nanoparticles as the electro-catalysts in the gas diffusion electrode for electro-catalytic conversion of $CO_2$. The carbon supported surface functionalized silver nanoparticles can be formed ex-situ or via novel in-situ methods described herein. Nanostructured silver catalysts have shown improved performance compared to their bulk counterparts, as they offer mass-transport advantages and more highly active sites on the edges and corners of the nanomaterials. By tuning nanomaterial composition, size, morphology, porosity, and surface modification, nanostructured catalyst behaviors can be adjusted for specific applications.

Surface modification is one of the effective approaches to improve catalytic performance. Studies have suggested that functional molecules can decrease the overpotential or improve CO selectivity, e.g., amine-capped Ag nanoparticles show better catalytic performance through stabilizing the COOH* intermediate.

Integration of such electro-catalysts into the Membrane Electrode Assembly (MEA) is another key step to obtain desirable products. A typical MEA comprises two gas diffusion layers (GDLs) and an ion exchange membrane with catalyst particles dispersed at the interface, and production of the MEA is similar to the various roll-to-roll production methods utilized in printing. Despite the great effort in developing MEAs for CO2 conversion systems, it remains challenging to fabricate MEAs with low cost, high standard performance, and tunable properties.

The present disclosure provides carbon supported surface functionalized silver nanoparticles that can be used to prepare MEAs. The carbon supported surface functionalized silver nanoparticles can be prepared using ex-situ methods or novel in-situ methods described herein.

In embodiments, the term "ex-situ" may refer to forming the surface functionalized silver nanoparticles separate from the carbon support and depositing the surface functionalized silver nanoparticles onto a surface of the carbon support or structure. For example, the silver nanoparticles may be surface functionalized in isolation away from the carbon structure before being added onto the surface of the carbon structure. In other words, the fully synthesized silver nanoparticles are removed from the liquid-containing composition that the surface functionalized silver nanoparticles were formed in and then added to the carbon structure.

In embodiments, the term "in-situ" refers to the presence of the carbon structure (that is, carbon support) in the same liquid-containing composition that the silver nanoparticles are synthesized/prepared in. In contrast, previous "ex-situ" methods removed the synthesized/prepared silver nanoparticles from the solution that the silver nanoparticles were synthesized/prepared in for their potential further processing. In embodiments, the carbon support may be added to the liquid-containing composition containing the silver nanoparticles during the process of surface functionalization of the silver nanoparticles or immediately after the surface functionalization process of the silver nanoparticles.

Previous methods to produce carbon supported silver nanoparticles resulted in long processing times, large particle sizes, a wide distribution of various different particles sizes, or uneven distribution (e.g., gathering of a large number of silver nanoparticles on certain surface areas and a small number of silver nanoparticles on other surface areas) on a surface of the carbon support. In one previous example, graphene oxide was prepared using a modified Hummers method. The graphene oxide was doped with nitrogen using dicyandiamide (DCDA) to prepare a nitrogen-doped graphene oxide (NGO). Afterwards, silver nanoparticles were synthesized using three different methods using a nominal silver content that is fixed at 40 wt %.

In a first method, citrate stabilized silver nanoparticles are prepared by reducing $AgNO_3$ with $NaBH_4$ in an aqueous solution in the presence of the NGO and sodium citrate. In a second method, an aqueous solution of glycerol and sodium hydroxide are added to the suspension of NGO containing $AgNO_3$. In a third method, a suspension of NGO and $AgNO_3$ is made, and the carbon supported silver nanoparticles are formed by reduction by slowly adding ascorbic acid to the mixture under constant stirring.

For these three methods, the mean particle sizes were 7 nanometers (nm), 38 nm, and 211 nm, respectively. In addition, the particle size distribution was also found to be relatively wide (e.g., a large distribution of various different sizes of particles). For example, in the first method, although particles as small as 7 nm can be seen, large particles up to 300 nm can also be found as aggregation occurs in the three methods described above.

Another previous method is the ex-situ or impregnation method. In the previous impregnation method, the carbon support is in contact with a solution containing the salt of a metal catalyst. Impregnation occurs by capillary action. Drawing the salt solution into the porous structure of the support and subsequent evaporation of the solution results in precipitation of metal salt in the pores of the support. In the case of supported metal catalysts, dispersion and distribution of the active phase are largely determined by the impregnation step.

A limitation of the impregnation technique is that the surface area of metal particles (m2/g) decreases as the metal loading increases. This occurs when the metal salt concentrates in a fixed number of pores; as the salt concentration increases, a larger mass of salt is precipitated in each pore (pore-concentration mechanism) and as a result larger metal particles are obtained when the metal salt is reduced.

In addition, scanning electron microscopy (SEM) images show that the impregnation method results in platelets as opposed to true nanoparticles or sphere shaped particles. The platelets are formed in non-uniform sizes as large as 2 microns. In addition, the platelets are unevenly distributed across the surface of the carbon substrate.

The in-situ synthesized carbon supported surface functionalized silver nanoparticles of the present disclosure can be prepared more efficiently than is possible using existing methods to prepare carbon supported amine functionalized silver nanoparticles, and with greater electro-catalytic performance. The greater electro-catalytic performance can be attributed to more uniform particle size distribution and uniform distribution of the particles on the surface of the microporous carbon support structures. For example, using the in-situ methods described herein, the particle size of the amine functionalized silver nanoparticles can be controlled. For example, the average diameter of the amine functionalized silver nanoparticles grown using the in-situ methods of the present disclosure can be between approximately 6 nanometers (nm) and approximately 8 nm and can have a range from between approximately 2 nm to approximately 18 nm. In addition, the aggregation of the silver nanoparticles that can lead to larger particle sizes may be prevented.

The in-situ synthesized carbon supported surface functionalized silver nanoparticles of the present disclosure can be prepared via two different in-situ methods. The two in-situ methods are an in-situ deposition method and an in-situ growth method.

In one embodiment, the present disclosure provides a composition of a carbon supported surface functionalized silver nanoparticle. The carbon supported surface functionalized silver nanoparticle can be formed by depositing surface functionalized silver nanoparticles onto a surface of the carbon via an ex-situ method or a novel in-situ method described herein. Silver nanoparticles can be surface functionalized by mixing silver acetate with organic moieties or nitrogen containing moieties. For example, a compound having small organic molecules or nitrogen molecules can attach to the surface of the silver particles. In one embodiment, the organic molecules may include compounds amino acids, or organic acids (e.g., mercaptoacetic acid, malic acid, oleic acid, and the like).

In one embodiment, the nitrogen containing moiety may include an amine, an amide, an imide, or a nitrogen containing aromatic compound. The amine may be a primary amine, a secondary amine, or a tertiary amine. Examples of primary amines may include hexylamine, heptylamine, octylamine, nonylamine, decylamine, undecylamine, dodecylamine, and the like. Examples of secondary amines may include piperidine, pyrrolidine, dipropylamine, dibutylamine, dipentylamine, dihexylamine, diheptylamine, dioctylamine, dinonylamine, didecylamine, diisopropylamine, and the like. Examples of tertiary amines may include diisopropylethylamine, triethylamine, diethylmethylamine, tripropylamine, tributylamine, tripentylamine, trihexylamine, triheptylamine, trioctylamine, trinonylamine, tridecylamine triundecylamine, tridodecylamine, and the like.

Example amides may include propanoamide, butanoamide, pentanoamide, hexanoamide, benzamide, N-methylbutanamide, N-ethylbutanamide, glutamine, asparagine, and the like. Example imides may include succinimide, maleimide, glutarimide, phthalimide, and the like. Example nitrogen containing aromatic compounds may include pyridine, 4-methylpyridine, 4-ethylpyridine, 4-propylpyridine, pyrrole, imidazole, 4-methylimidazole, and the like.

In one embodiment, functionalizing the silver nanoparticles may refer to changing nanomaterial properties to add certain functionality through assembling different nitrogen containing materials via covalent or noncovalent bonds, such as hydrogen bonds, electrostatic force, van der Waals force, and the like.

In one embodiment, the carbon supported surface functionalized silver nanoparticles may be prepared with dodecylamine. Thus, the silver nanoparticles can be functionalized to bond with a carbon substrate by attaching dodecylamine to the silver nanoparticles through noncovalent bonds. For example, the nitrogen molecule can be coordinated to the silver molecules to form the noncovalent bonds. The carbon support can be treated with acid before depositing the surface functionalized silver nanoparticles.

In one embodiment, the carbon supported surface functionalized silver nanoparticles prepared ex-situ without acid treatment may have a range of particle diameters of from about 7 nm to about 36 nm. In one example, the average diameter was 25.87 nm with a standard deviation of 12.51.

In one embodiment, the carbon supported surface functionalized silver nanoparticles prepared ex-situ with acid treatment may have a range of particle diameters of from about 8 nm to about 69 nm. In one example, the average diameter was 36.10 nm with a standard deviation of 15.56.

In one embodiment, the carbon supported surface functionalized silver nanoparticles prepared in-situ may have a range of particle diameters of from about 2 nm to about 18 nm with an average diameter of from about 6 nm to about 8 nm.

The term "average particle size" (or "average diameter") as used herein may refer to the volume-based median particle diameter (e.g., the particle diameter below which 50% by volume of the particle population is found). Particle diameters and particle size distributions may be determined by laser diffraction in accordance with ISO 13320:2009. In one embodiment, ImageJ software was used to analyze the silver particle size. The diameters of the particles were measured using a straight line length measurement tool on the pixels of the image. The scale bar was measured in pixels and used to convert the diameter values to nanometers. Fifteen random particles were measured for each TEM image and the averaged values were reported with standard deviation.

Figure 1:
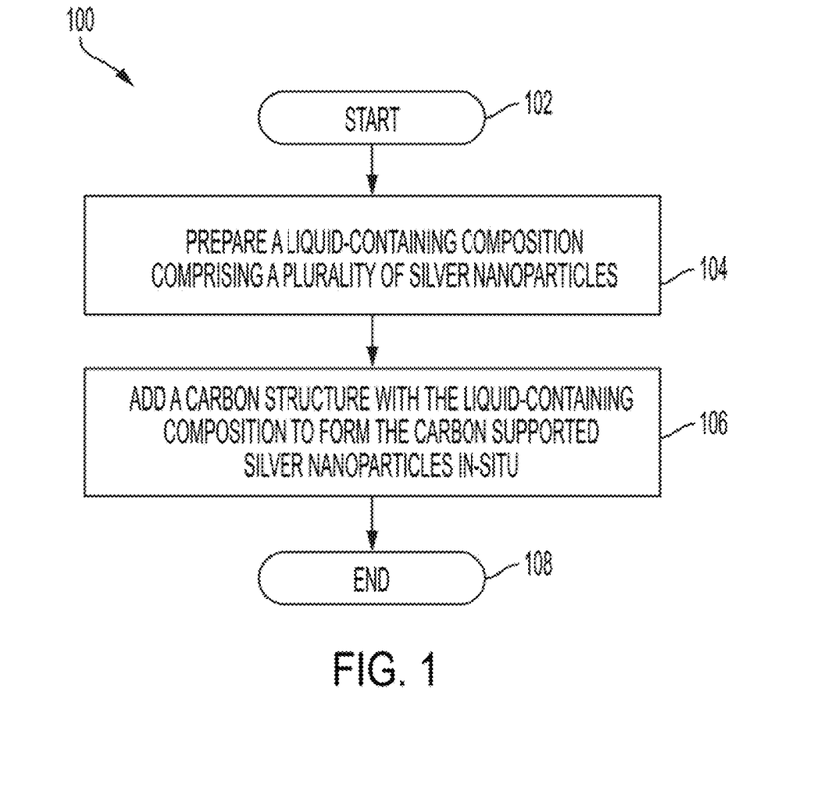
FIG. 1 illustrates a flowchart of an example method for preparing an in-situ synthesized carbon supported silver nanoparticles of the present disclosure.

As noted above, the in-situ methods described herein may include an in-situ deposition method and an in-situ growth method. FIG. 1 illustrates an example flowchart of a method 100 for preparing in-situ synthesized carbon supported surface functionalized silver nanoparticles using the in-situ deposition method. The method 100 beings at block 102.

At block 104, the method 100 prepares a liquid-containing composition of a plurality of silver nanoparticles. In one embodiment, the silver nanoparticles may be surface functionalized. For example, silver nanoparticles, a moiety with a nitrogen molecule, and a solvent may be mixed together to prepare the liquid-containing composition of the surface functionalized silver nanoparticles. The silver nanoparticles may be provided using silver acetate.

The nitrogen containing moiety may include an amine, an amide, an imide, or a nitrogen containing aromatic compound, all of which are described in detail above. In the examples described herein, dodecylamine was used as the nitrogen containing moiety.

The liquid/solvent may a polar liquid/solvent. Examples of polar liquids/solvents may include one or more of isopropanol, ethanol, water, and the like.

The liquid-containing composition of the silver nanoparticles, the nitrogen containing moiety, and the solvent may be mixed with stirring for a desired amount of time at a desired temperature range to help control a size of the surface functionalized silver nanoparticles that are formed.

In one embodiment, a reducing agent may be added to the mixture to help precipitate the surface functionalized silver nanoparticles out of solution. A ratio of the silver nanoparticles, the amine ligand of the nitrogen containing moiety, and the selected reducing agent may affect a particle size of the surface functionalized silver nanoparticles that are formed.

In one embodiment, the strength of the reducing agent may have the largest effect on the particle size. For example, a stronger reducing agent may produce a smaller particle size and a weaker reducing agent may produce a larger particle size. Examples of stronger reducing agents may include sodium borohydride ($NaBH_4$), lithium aluminum hydride, ($LiAlH_4$), sodium aluminum hydride ($NaAlH_2$), phenylhydrazine, tosylhydrazide, hydrazine, and the like. Examples of weaker reducing agents may include ascorbic acid ($C_6H_8O_8$), formic acid (HCOOH), oxalic acid ($C_2H_2O_4$), dimethylformamide (DMF), ammonium formate, methanol, formamide, and the like. The reducing agent may be added in an amount of 1 equivalent and may be added up to amounts as high as 10 equivalents.

At block 106, the method 100 adds a carbon structure with the liquid-containing composition to form the carbon supported silver nanoparticles in-situ. The carbon structure may be a porous or non-porous carbon structure. In one embodiment, the carbon structure may be a microporous carbon structure. Examples of the microporous carbon structure may include carbon black, carbon nanotubes, graphene, and the like. The microporous carbon structure may be mixed with a solvent and then added to the liquid-containing composition. For example, the solvent may be isopropanol, ethanol, water, and the like. "Carbon supported" may be understood to mean that the surface functionalized silver nanoparticles are on the surface of the carbon structure. The carbon structure may be larger than the surface functionalized silver nanoparticles. For example, the carbon structure can be 50-100 nanometers (nm) in diameter versus the surface functionalized silver nanoparticles that can be 5-20 nm in diameter. Thus, the smaller silver nanoparticles can be formed on the surface of the carbon structure.

The in-situ synthesized carbon supported surface functionalized silver nanoparticles that are formed may then be filtered out of the liquid-containing composition, rinsed, and dried. The in-situ synthesized carbon supported surface functionalized silver nanoparticles may then be used for various applications, such as preparation into an ink form to be printed onto substrates to form gas diffusion electrodes for $CO_2$ conversion systems.

In one embodiment, an ionomer may be added to the in-situ synthesized carbon supported surface functionalized silver nanoparticles to prepare stable inks. Examples of ionomers that can be used include an alkaline based ionomers mixed with a polar solvent (e.g., Sustainion XA-9), polystyrene, sulfonate, nafion, and the like. The method 100 ends at block 108.

Example 1 below provides an example of the preparation of the in-situ synthesized carbon supported surface functionalized silver nanoparticles via the in-situ deposition method.

Example 1

Melted dodecylamine (155.67 grams (g), 0.8398 mol) was added to a 1 Liter (L), 3 necked round bottom flask, fitted with an overhead stirring system, a thermometer, and an Argon (Ar) line. The reaction flask was immersed in a 35 degrees Celsius (° C.) water bath and stirring set to 300 rotations per minute (RPM). To the flask was then added 10.5 milliliters (mL) methanol followed by 52 mL decalin. Phenylhydrazine (11.3 g, 0.1048 mol) was then added with stirring and temperature stabilized at 35° C. Silver acetate powder (35 g, 0.2097 mol) was slowly added to the mixture, keeping the reaction temperature between 35-37° C. Stirring slowly ramped to 500 RPM over silver acetate addition. Once the entirely of silver acetate was added, the reaction was brought to 40° C. and stirred for 1 hour.

After 1 hour, 35.7 g of Vulcan XC72 carbon black dispersed in 200 mL of decalin was added slowly to the reaction mixture. The mixture was stirred at 40° C. for 2 hours.

400 mL of methanol was added after the 2 hours and stirred for 15 minutes. Precipitate was filtered on a Buchner funnel with 2 filter media added (Whatman 934 AH glass fibre paper on bottom, Whatman #54 filter paper on top). Filtration afforded a black paste which was reslurried in 200 mL methanol for 15 minutes and filtered. Wash repeated one additional time and dried under vacuum for 15 minutes to give black wetcake. Material then transferred to amber bottle, purged with argon and dried in vacuum oven at room temperature overnight to give AgNP coated carbon black powder (57 g).

In one embodiment, the in-situ deposition method was shown to grow surface functionalized silver nanoparticles with a relatively small average diameter. For example, the average diameter of the surface functionalized silver nanoparticles that were synthesized with the in-situ deposition method were found to be approximately 7-8 nanometers (nm). In an example, the average diameter was approximately 7.22 nm with a standard deviation of 3.69. The surface functionalized silver nanoparticles were found to have a range of diameters from approximately 2 to 18 nm.

Examples 2 and 3 provide examples of how the in-situ synthesized carbon supported surface functionalized silver nanoparticles are prepared into stable inks. Example 2 provides an example of an ink prepared with an ionomer and Example 3 provides an example of an ink prepared without the ionomer.

Example 2

The cathode catalyst ink was prepared by mixing 225 mg of the in-situ synthesized carbon supported surface functionalized silver nanoparticles prepared in Example 1 (40 wt %) with 27.1 ml of Toluene, 1.94 g of 2.5 wt % Sustainion XA-9/Toluene dispersion (e.g., the ionomer), then ultrasonicating for 60 min.

Example 3

The cathode catalyst ink was prepared by mixing 225 mg of the in-situ synthesized carbon supported surface functionalized silver nanoparticles prepared in Example 1 (40 wt %) with 30 ml of Toluene, then ultra-sonicating for 60 min. The mass ratio of Ag loading was 0.34%.

Figure 2:
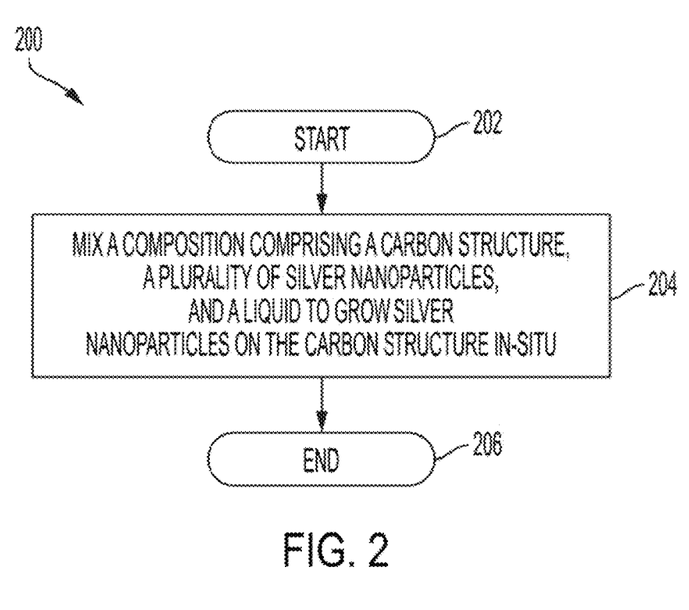
FIG. 2 illustrates a flowchart of another example method for preparing an in-situ synthesized carbon supported silver nanoparticles.

FIG. 2 illustrates an example flowchart of a method 200 for preparing in-situ synthesized carbon supported surface functionalized silver nanoparticles using the in-situ growth method. The method 200 beings at block 202.

At block 204, the method 200 mixes a composition comprising a carbon structure, a plurality of silver nanoparticles, and a liquid to grow silver nanoparticles on the carbon structure in-situ. In one embodiment, the composition may further include a nitrogen containing moiety to surface functionalize the silver nanoparticles in the liquid-containing composition. For example, the functionalized silver nanoparticles may be precipitated out of liquid-containing composition directly onto the surface of the microporous carbon structure that is also present in the liquid containing composition.

In one embodiment, the carbon structure may be a porous or non-porous carbon structure. In one embodiment, the carbon structure may be a microporous carbon structure. Examples of the microporous carbon structure may include carbon black, carbon nanotubes, graphene, and the like.

The nitrogen containing moiety may include an amine, an amide, an imide, or a nitrogen containing aromatic compound, all of which are described above in the present disclosure. In the examples described herein, dodecylamine was used as the nitrogen containing moiety.

The liquid may be a solvent. The solvent may be any type of polar solvent. Examples of liquids/polar solvents may include one or more of isopropanol, butanol, water, and the like.

The mixture of the silver nanoparticles, the nitrogen containing moiety, and the solvent may be mixed with stirring for a desired amount of time at a desired temperature range to help control a size of the surface functionalized silver nanoparticles that are formed.

In one embodiment, a reducing agent may be added to the mixture to help precipitate the surface functionalized silver nanoparticles out of the liquid-containing composition. A ratio of the silver nanoparticles, the amine ligand of a moiety with an amine functional group, and the selected reducing agent may affect a particle size of the surface functionalized silver nanoparticles that are formed.

In one embodiment, the strength of the reducing agent may have the largest effect on the particle size. For example, a stronger reducing agent may produce a smaller particle size and a weaker reducing agent may produce a larger particle size. Examples of stronger reducing agents may include sodium borohydride ($NaBH_4$), lithium aluminum hydride, ($LiAlH_4$), sodium aluminum hydride ($NaAlH_2$), phenylhydrazine, tosylhydrazide, hydrazine, and the like. Examples of weaker reducing agents may include ascorbic acid ($C_6H_8O_8$), formic acid (HCOOH), oxalic acid ($C_2H_2O_4$), dimethylformamide (DMF), ammonium formate, methanol, formamide, and the like. The reducing agent may be added in an amount of 1 equivalent and may be added up to amounts as high as 10 equivalents.

The in-situ synthesized carbon supported surface functionalized silver nanoparticles that are formed may then be filtered out of solution, rinsed, and dried. The in-situ synthesized carbon supported surface functionalized silver nanoparticles may then be used for various applications, such as preparation into an ink form to be printed onto substrates to form gas diffusion electrodes for $CO_2$ conversion systems.

In one embodiment, an ionomer may be added to the in-situ synthesized carbon supported surface functionalized silver nanoparticles to prepare stable inks. Examples of ionomers that can be sued include an alkaline based ionomers mixed with a polar solvent (e.g., Sustainion XA-9), polystyrene, sulfonate, nafion, and the like. The method 200 ends at block 206.

Example 4 below provides an example of the preparation of the in-situ synthesized carbon supported surface functionalized silver nanoparticles via the in-situ growth method.

Example 4

Melted dodecylamine (155.67 grams (g), 0.8398 mol) was added to a 1 Liter (L), 3 necked round bottom flask, fitted with an overhead stirring system, a thermometer, and an Argon (Ar) line. The reaction flask was immersed in a 35° C. water bath and stirring set to 300 RPM. To the flask was then added 10.5 mL methanol followed by 52 mL decalin. Next, 35.7 g of Vulcan XC72 carbon black was added along with 200 mL of a 5:1 decalin:methanol solution. The mixture was stirred at 500 RPM for 15 minutes until carbon black was sufficiently dispersed. Phenylhydrazine (11.3 g, 0.1048 mol) was then added with stirring and temperature stabilized at 35° C. Silver acetate powder (35 g, 0.2097 mol) was slowly added to the mixture, keeping the reaction temperature between 35-37° C. Stirring slowly ramped to 500 RPM over silver acetate addition. Once the entirely of silver acetate was added, the reaction was brought to 40° C. and stirred for 1 hour.

400 mL of methanol was added after the 1 hour of mixing and stirred for 15 minutes. Precipitate was filtered on a Buchner funnel with 2 filter media added (Whatman 934 AH glass fibre paper on bottom, Whatman #54 filter paper on top). Filtration afforded a black paste which was reslurried in 200 mL methanol for 15 minutes and filtered. Wash repeated one additional time and dried under vacuum for 15 minutes to give black wetcake. Material then transferred to amber bottle, purged with argon and dried in vacuum oven at room temperature overnight to give AgNP coated carbon black powder AC1552 (57 g).

In one embodiment, the in-situ growth method was shown to grow surface functionalized silver nanoparticles with a relatively small average diameter. For example, the average diameter of the surface functionalized silver nanoparticles that were synthesized with the in-situ growth method were found to be approximately 6-7 nanometers (nm). In an example, the average diameter was approximately 6.29 nm with a standard deviation of 4.16. The surface functionalized silver nanoparticles were found to have a range of diameters from approximately 2 to 15 nm.

Examples 5 and 6 provide examples of how the in-situ synthesized carbon supported surface functionalized silver nanoparticles are prepared into stable inks. Example 5 provides an example of an ink prepared with an ionomer and Example 6 provides an example of an ink prepared without the ionomer.

Example 5

The cathode catalyst ink was prepared by mixing 225 mg of the in-situ synthesized carbon supported surface functionalized silver nanoparticles prepared in Example 2 (40 wt %) with 27.1 ml of Toluene, 1.94 g of 2.5 wt % Sustainion XA-9/Toluene dispersion (e.g., the ionomer), then ultra-sonicating for 60 min.

Example 6

The cathode catalyst ink was prepared by mixing 225 mg of the in-situ synthesized carbon supported surface functionalized silver nanoparticles prepared in Example 2 (40 wt %) with 30 ml of Toluene, then ultra-sonicating for 60 min. The mass ratio of Ag loading was 0.34%.

Figure 3:
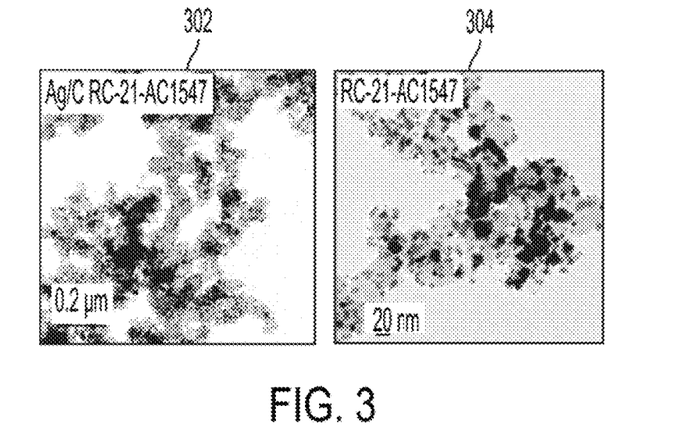
FIG. 3 illustrates example transmission electron microscopy (TEM) images at different magnification levels of example in-situ synthesized carbon supported surface functionalized silver nanoparticles formed via an in-situ deposition method.
Figure 4:
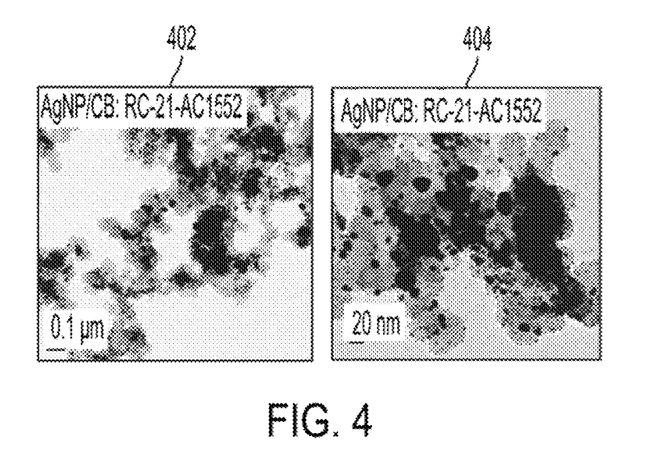
FIG. 4 illustrates example TEM images at different magnification levels of example in-situ synthesized carbon supported surface functionalized silver nanoparticles formed via an in-situ growth method.

FIGS. 3 and 4 provide transmission electron microscopy (TEM) images of the in-situ synthesized carbon supported surface functionalized silver nanoparticles prepared via the in-situ deposition and in-situ growth methods. For example, FIG. 3 illustrates TEM images 302 and 304 that show different magnifications of the in-situ synthesized carbon supported surface functionalized silver nanoparticles prepared via the in-situ deposition method. FIG. 4 illustrates TEM images 402 and 404 that show different magnifications of the in-situ synthesized carbon supported surface functionalized silver nanoparticles prepared via the in-situ growth method.

As can be seen in the images 302, 304, 402, and 404, the methods described herein to prepare the in-situ synthesized carbon supported surface functionalized silver nanoparticles create very uniform, discrete particles that are evenly distributed across the surface of the carbon support. In other words, the in-situ synthesized carbon supported surface functionalized silver nanoparticles may have a different physical appearance than ex-situ synthesized carbon supported surface functionalized silver nanoparticles. In one embodiment, the average diameter of the surface functionalized silver nanoparticles formed using the in-situ methods described herein may range between approximately 6 nanometers (nm) and approximately 8 nm. For example, as noted above, the in-situ deposition method may form surface functionalized silver nanoparticles with an average diameter of approximately 7.22 nm, and the in-situ growth method may form surface functionalized silver nanoparticles with an average diameter of approximately 6.29 nm.

In one embodiment, the average particle size (or diameter) of the surface functionalized silver nanoparticles may be approximately 7 nm in the in-situ deposition method. The term "average particle size" as used herein may refer to the volume-based median particle diameter (e.g., the particle diameter below which 50% by volume of the particle population is found). Particle diameters and particle size distributions may be determined by laser diffraction in accordance with ISO 13320:2009.

In one embodiment, "even particle size distribution" may be understood to mean that greater than 90% of the surface functionalized silver nanoparticles have a particle diameter or size of from about 2 nm to about 18 nm. Said another way, the particle size distribution graph for the in-situ deposition method may be very narrow, with a peak formed between approximately 2-18 nm. In other words, there is minimal agglomeration of the surface functionalized silver nanoparticles. Rather, the surface functionalized silver nanoparticles are formed on the carbon support with a very consistent particle diameter size distribution.

In one embodiment, the terms "evenly distributed across the surface" and "uniform distribution" may be understood to mean having an approximately equal number (e.g., within +/−5%) of surface functionalized silver nanoparticles per microporous carbon structure. The terms "evenly distributed across the surface" and "uniform distribution" may also be defined based on a distance between adjacent surface functionalized silver nanoparticles on the surface of the microporous carbon structure. For example, the distance between adjacent surface functionalized silver nanoparticles may be approximately the same (e.g., within +/−5%) across a surface of the microporous carbon structure to have a "uniform distribution."

As can be seen in the images 302 and 304, there is also a high amount of surface area coverage of the surface functionalized silver nanoparticles on the surface of the microporous carbon structure. For example, the in-situ deposition method can provide over 90% coverage of the surface area of the microporous carbon structure.

In the in-situ deposition method, the particle size of the silver nanoparticles can be well controlled. Since the carbon source is added to the reaction mixture immediately after the surface functionalized silver nanoparticle formation, there is no time for particles to aggregate. Without the immediate addition of the carbon source, the particles may be isolated in solid form, which can add to risk of destabilization and/or aggregation. In one embodiment, "immediately" may be defined as within 1 hour of when the silver moiety is added to the solvent or any time before isolation of the silver nanoparticles occurs.

Figure 5:
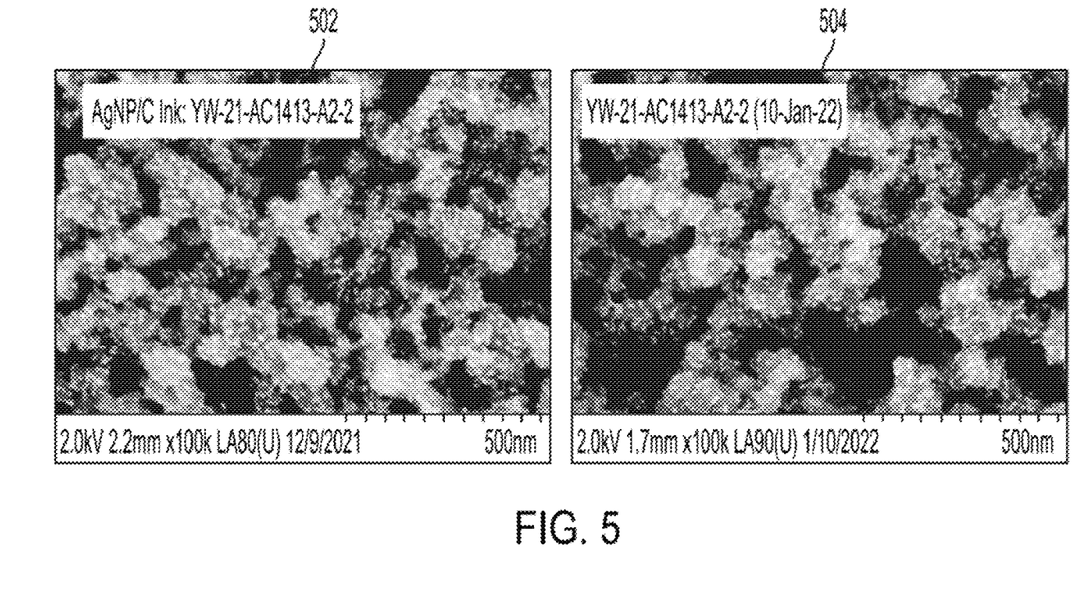
FIG. 5 illustrates example scanning electron microscopy (SEM) images at different times to illustrate the unchanged morphology of the in-situ synthesized carbon supported surface functionalized silver nanoparticles formed via an in-situ deposition method.

This can be leveraged into stabilizing particles that may not be particularly stable. For example, SEM images of the in-situ synthesized carbon supported surface functionalized silver nanoparticles were captured at different time periods. For example, FIG. 5 illustrates an image 502 and an image 504 that were captured one month apart. The SEM images 502 and 504 show an unchanged morphology over time of the in-situ synthesized carbon supported surface functionalized silver nanoparticles prepared via an in-situ deposition method. In other words, the SEM images showed that the particles did not aggregate over time.

In contrast, unsupported silver nanoparticles are shown to aggregate rather quickly over time within the solvent solution. For example, Table 1 below illustrates the gradual increase in size distribution over a period of several hours or days.

TABLE 1

UNSUPPORTED SILVER NANOPARTICLE SIZE DISTRIBUTION OVERTIME

| Time (hrs) | Z(average) nm | Z(Primary Distribution) nm | D(1,0) nm |
|---|---|---|---|
| 0 | 92.5 | 10.3 | 8.3 |
| 24 | 111.0 | 106 | 8.6 |
| 48 | 132.2 | 10.7 | 8.6 |

In one embodiment, the particle size of the surface functionalized silver nanoparticles in the in-situ growth method may range between approximately 2-15 nanometers (nm).

In one embodiment, the average particle size (or diameter) of the surface functionalized silver nanoparticles may be approximately 6 nm in the in-situ growth method. The term "average particle size" (or "average diameter") as used herein may refer to the volume-based median particle diameter (e.g., the particle diameter below which 50% by volume of the particle population is found). Particle diameters and particle size distributions may be determined by laser diffraction in accordance with ISO 13320:2009.

In one embodiment, the term "even particle size distribution" may be understood to mean that greater than 90% of the surface functionalized silver nanoparticles have a particle diameter or size of from about 2 nm to about 15 nm. Said another way, the particle size distribution graph for the in-situ growth method may be very narrow, with a peak formed between approximately 2-15 nm.

In one embodiment, the terms "evenly distributed across the surface" and "uniform distribution" may be understood to mean having an approximately equal number (e.g., within +/−5%) of surface functionalized silver nanoparticles per microporous carbon structure. The terms "evenly distributed across the surface" and "uniform distribution" may also be defined based on a distance between adjacent surface functionalized silver nanoparticles on the surface of the microporous carbon structure. For example, the distance between adjacent surface functionalized silver nanoparticles may be approximately the same (e.g., within +/−5%) across a surface of the microporous carbon structure to have a "uniform distribution."

As can be seen in the images 502 and 504, there is also a high amount of surface area coverage of the surface functionalized silver nanoparticles on the surface of the microporous carbon structure. For example, the in-situ deposition method can provide over 90% coverage of the surface area of the microporous carbon structure.

In the in-situ growth method, the particle size of the silver nanoparticles can be well controlled. By adding the carbon source before the reduction of silver acetate occurs, the resultant silver nanoparticles can be grown directly onto the support structure. Due to the particles being supported, the particle size can be controlled by tuning the ratios of silver, stabilizer, and reducing agent.

Figure 6:
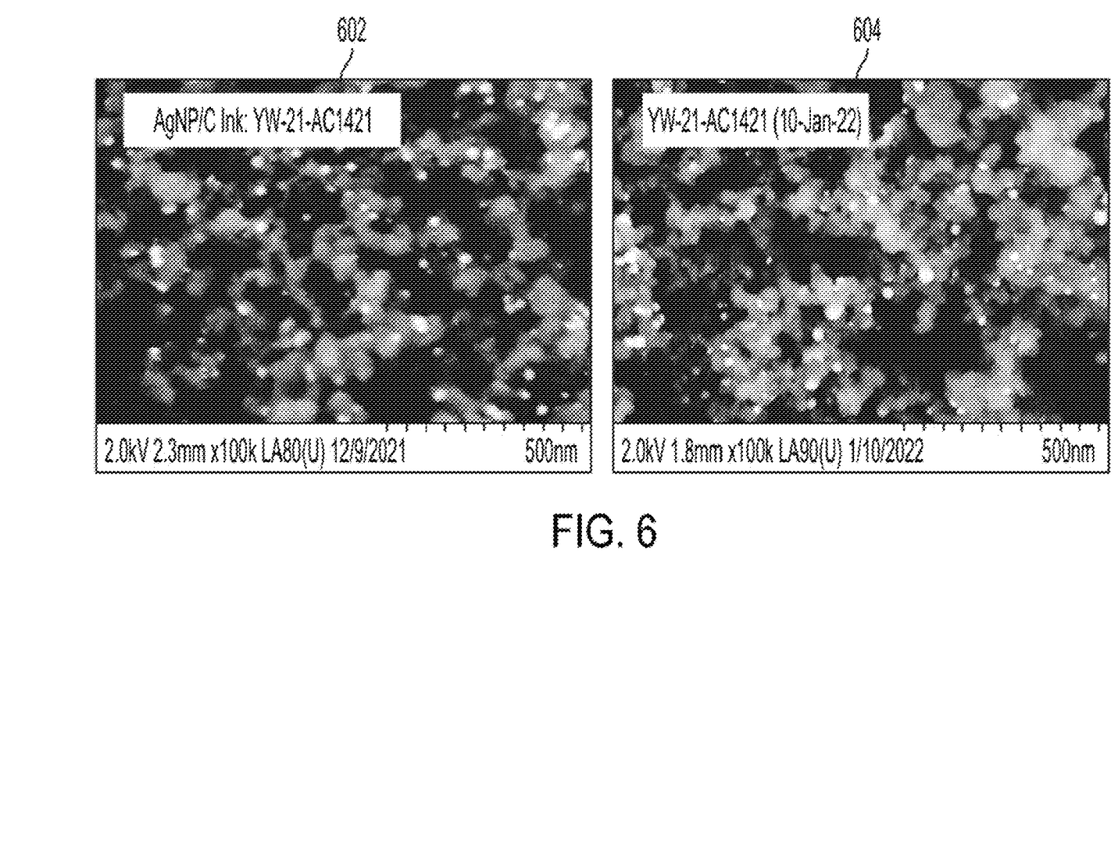
FIG. 6 illustrates example SEM images at different times to illustrate the unchanged morphology of the in-situ synthesized carbon supported surface functionalized silver nanoparticles formed via an in-situ growth method.

This can be leveraged into stabilizing particles that may not be particularly stable. For example, SEM images of the in-situ synthesized carbon supported surface functionalized silver nanoparticles were captured at different time periods. For example, FIG. 6 illustrates an image 602 and an image 604 that were captured one month apart. The SEM images 602 and 604 show an unchanged morphology over time of the in-situ synthesized carbon supported surface functionalized silver nanoparticles prepared via an in-situ growth method. In other words, the SEM images showed that the particles did not aggregate over time.

Thus, the present disclosure provides carbon supported surface functionalized silver nanoparticles. The present disclosure also provides an in-situ method, in addition to the ex-situ method, to synthesize carbon supported surface functionalized silver nanoparticles that provide as good, or better, electro catalytic performance. The in-situ synthesized carbons supported surface functionalized silver nanoparticles can be prepared using an in-situ deposition method or an in-situ growth method that forms the in-situ synthesized carbons supported surface functionalized silver nanoparticles with uniform particle size distributions, very high coverage of the surface of the microporous carbon structure, and even coverage of the surface of the microporous carbon structure with the surface functionalized silver nanoparticles.

The in-situ synthesized carbons supported surface functionalized silver nanoparticles can be prepared into printable inks that can be used for a variety of different applications, such as catalysts, chemical sensors, biomedicines, medical devices, functional textiles, cosmetics, food packaging, food supplements, odor-resistant items, electronics, household appliances, dental amalgam, water disinfectants, paints/inks, and the like.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. An in-situ method to prepare carbon supported silver nanoparticles, comprising:
   preparing a liquid-containing composition comprising a plurality of silver nanoparticles, wherein the plurality of silver nanoparticles is surface functionalized for controlling a particle size of the plurality of silver nanoparticles; and
   adding a carbon structure to the liquid-containing composition to form the carbon supported silver nanoparticles in-situ, wherein the carbon supported silver nanoparticles comprise silver nanoparticles formed on a surface of the carbon structure wherein the plurality of silver nanoparticles is surface functionalized using an amine.

2. The method of claim 1, wherein the preparing comprises:
   mixing the plurality of silver nanoparticles, a nitrogen containing moiety, and a liquid.

3. The method of claim 2, wherein the plurality of silver nanoparticles, the nitrogen containing moiety, and the liquid are stirred until the plurality of silver nanoparticles reaches a particle size distribution.

4. The method of claim 2, wherein the plurality of silver nanoparticles comprises silver acetate.

5. An in-situ method to prepare carbon supported silver nanoparticles, comprising:
   mixing a composition comprising a carbon structure, a plurality of silver nanoparticles, and a liquid to grow silver nanoparticles on a surface of the carbon structure in-situ, wherein the plurality of silver nanoparticles is surface functionalized for controlling a particle size of the plurality of silver nanoparticles wherein the plurality of silver nanoparticles is surface functionalized using an amine.

6. The method of claim 5, wherein the composition further includes a nitrogen containing moiety, wherein the plurality of silver nanoparticles is surface functionalized resulting in nitrogen surface functionalized silver nanoparticles.

7. The method of claim 6, further comprising:
   adding a reducing agent to precipitate the silver nanoparticles in the liquid.

8. The method of claim 6, wherein the plurality of silver nanoparticles comprises silver acetate.

9. The method of claim 6, further comprising:
   adding an ionomer to the composition to result in the composition being a printable ink.

10. The method of claim 1, wherein a diameter of the carbon structure is greater than a diameter of each silver nanoparticle of the plurality of silver nanoparticles.

11. The method of claim 5, wherein a diameter of the carbon structure is greater than a diameter of each silver nanoparticle of the plurality of silver nanoparticles.

12. The method of claim 1, wherein the amine comprises dodecylamine.

13. The method of claim 5, wherein the amine compromises dodecylamine.

* * * * *